US010956027B2

(12) United States Patent
Kurabayashi

(10) Patent No.: US 10,956,027 B2
(45) Date of Patent: Mar. 23, 2021

(54) PROGRAM AND PORTABLE TERMINAL FOR SELECTING A COMMAND USING A FINGER AND EXECUTING THE COMMAND IN RESPONSE TO AN OPERATION PERFORMED WITH A SECOND FINGER IN AN ACCEPTABLE AREA

(71) Applicant: CYGAMES, INC., Tokyo (JP)

(72) Inventor: Shuichi Kurabayashi, Tokyo (JP)

(73) Assignee: CYGAMES, INC., Tokyo (JP)

(*) Notice: Subject to any disclaimer, the term of this patent is extended or adjusted under 35 U.S.C. 154(b) by 105 days.

(21) Appl. No.: 15/969,629

(22) Filed: May 2, 2018

(65) Prior Publication Data
US 2018/0275864 A1 Sep. 27, 2018

Related U.S. Application Data

(63) Continuation of application No. PCT/JP2016/078017, filed on Sep. 23, 2016.

(30) Foreign Application Priority Data

Nov. 4, 2015 (JP) .............................. JP2015-216652

(51) Int. Cl.
*G06F 3/0488* (2013.01)
*A63F 13/2145* (2014.01)
(Continued)

(52) U.S. Cl.
CPC ...... *G06F 3/04883* (2013.01); *A63F 13/2145* (2014.09); *A63F 13/428* (2014.09);
(Continued)

(58) Field of Classification Search
CPC .......... A64F 13/2145; A63F 2300/1075; A63F 13/426; A63F 13/53; G06F 3/0488;
(Continued)

(56) References Cited

U.S. PATENT DOCUMENTS 6,409,604 B1* 6/2002 Matsuno ................. A63F 13/10
463/43
8,239,784 B2 8/2012 Hotelling et al.
(Continued)

FOREIGN PATENT DOCUMENTS

JP H05-073196 A 3/1993
JP 2010-055207 A 3/2010
(Continued)

OTHER PUBLICATIONS

Starcraft Game Manual, published 1998 (Year: 1998).*
(Continued)

*Primary Examiner* — Eric J Yoon
(74) *Attorney, Agent, or Firm* — Osha Bergman Watanabe & Burton LLP

(57) ABSTRACT

A non-transitory computer readable medium contains a program for a portable terminal including a touchscreen having a first area for selecting a command and a second area in which objects are displayed. The program causes a computer to store command information indicating associations between commands and objects that may serve as targets of the commands regarding a plurality of commands in relation to a plurality of objects, store position information indicating displayed positions of the individual objects in the second area, select the command based on a state in which an operation is being performed with a first finger of a user in the first area, and define, based on the command information and the position information, an area corresponding to the display position of an object that may serve as a target of the selected command in the second area as an area in which an operation is acceptable.

16 Claims, 10 Drawing Sheets

(51) Int. Cl.
*A63F 13/53* (2014.01)
*A63F 13/428* (2014.01)

(52) U.S. Cl.
CPC ............ *A63F 13/53* (2014.09); *G06F 3/0488* (2013.01); *G06F 3/04886* (2013.01)

(58) Field of Classification Search
CPC ....... G06F 2203/04808; G06F 3/04883; G06F 3/04886
See application file for complete search history.

(56) References Cited

U.S. PATENT DOCUMENTS

| 2011/0300910 | A1 | 12/2011 | Choi | |
| 2015/0169165 | A1* | 6/2015 | Bacus | G06F 3/04883 715/863 |
| 2015/0268802 | A1 | 9/2015 | Kim et al. | |
| 2016/0317915 | A1* | 11/2016 | Onda | A63F 13/2145 |

FOREIGN PATENT DOCUMENTS

| JP | 2015-185161 A | 10/2015 |
| KR | 10-2012-0007384 A | 1/2012 |
| KR | 10-2015-0111651 A | 10/2015 |

OTHER PUBLICATIONS

P. Thurott, Windows 8 Secrets, selected excerpts, published Sep. 4, 2012 (Year: 2012).*

Filmire, "FFXIV ARR: Controller Targeting Tips," published Mar. 2, 2015, YouTube video found at https://www.youtube.com/watch?v=E6kshr9EQIE (Year: 2015).*

International Search Report issued in corresponding International Application No. PCT/JP2016/078017, dated Nov. 22, 2016 (2 pages).

Tagaya, Masashi, et al.; "Yubi no Kinsetsu Ichi Joho o Riyo shita User Sosa Shien Kino no Kaihatsu;" NTT DOCOMO Technical Journal; vol. 21, No. 3, pp. 24-28; Oct. 1, 2013 (8 pages).

* cited by examiner

COMMAND INFORMATION

| POSITION | SITUATION | COMMAND IDENTIFIER | OBJECT SELECTION INFORMATION | ADJUSTMENT INFORMATION | | IMAGE IDENTIFIER |
|---|---|---|---|---|---|---|
| | | | | SIZE | Z ORDER | |
| P1 | C1 | arrow_shot | enemy | 1.5 | 0 | arrow_image |
| P2 | C2 | vulnerary | party | 1.5 | 0 | vulnerary_image |
| ... | ... | ... | ... | ... | ... | ... |

FIG. 4

POSITION INFORMATION

| OBJECT IDENTIFIER | NAME | ATTRIBUTE | POSITION | SHAPE |
|---|---|---|---|---|
| O1 | object_A | party | X1, Y1 | S1 |
| O2 | object_B | enemy | X2, Y2 | S2 |
| O3 | object_C | enemy | X3, Y3 | S3 |
| ⋮ | ⋮ | ⋮ | ⋮ | ⋮ |

FIG. 5

PROGRAM AND PORTABLE TERMINAL FOR SELECTING A COMMAND USING A FINGER AND EXECUTING THE COMMAND IN RESPONSE TO AN OPERATION PERFORMED WITH A SECOND FINGER IN AN ACCEPTABLE AREA

BACKGROUND

Technical Field

The present invention relates to programs and portable terminals.

Related Art

As portable terminals such as smartphones and tablet terminals come into widespread use, games of the type in which user input is performed via a touchscreen are increasing in number. With conventional game machines, for example, it has been the case that various kinds of user input are performed by using combinations of a direction key (cross-shaped key) and buttons. Also in a game in which a touchscreen is used, it is conceivable to display, for example, a direction key and buttons similar to those on conventional game machines on the touchscreen; however, this will not be easy to operate. Thus, in a game in which a touchscreen is used, there is a need for a user interface that is different from the user interfaces of conventional game machines.

For example, Patent Literature 1 discloses a method of switching the mode of a user interface by using a hold operation on a touchscreen (e.g., FIGS. 17A to 17E of Patent Literature 1). Specifically, for example, when a hold with the left thumb is continued on the touchscreen, a plurality of buttons are displayed in the vicinity of an area where the hold is being performed, and when one of the plurality of buttons is selected with the left thumb, the mode is switched in accordance with the selected button. Then, for example, an operation is performed with the right index finger in the resulting mode.

CITATION LIST

Patent Literature

PTL 1
  Specification of the U.S. Pat. No. 8,239,784

SUMMARY OF INVENTION

With the method disclosed in Patent Literature 1, in order to switch the mode of the user interface, it is necessary to select one of the buttons that are displayed when a hold is continued. That is, a two-step operation, namely, a hold operation and the selection of a button, is required. Furthermore, with this method, since the number of buttons increases with the number of modes, the area needed for switching the mode increases. Thus, the method is not suitable for a user interface requiring operations for quickly entering a large variety of commands.

Furthermore, in a game in which a touchscreen is used, there are cases where an operation of selecting (tapping) an object (character) displayed on the touchscreen is performed. However, since finger sizes and habits vary among users, a considerable deviation often occurs between a position that a user intended to tap and a position recognized by the system. In such cases, the user has a hard time performing a user input as intended.

One or more embodiments of the present invention provides a user interface that makes it possible to enter a large variety of commands in relation to objects quickly, in a small area, and precisely on a portable terminal having a touchscreen.

A non-transitory computer readable medium containing a program according to one or more embodiments of the present invention is a program for a portable terminal including a touchscreen having a first area for selecting a command and a second area in which objects are displayed, the program causing a computer to perform storing command information indicating associations between commands and objects that may serve as targets of the commands regarding a plurality of commands in relation to a plurality of objects; storing position information indicating displayed positions of the individual objects in the second area; selecting the command based on a state in which an operation is being performed with a first finger of a user in the first area; defining, based on the command information and the position information, an area corresponding to the display position of an object that may serve as a target of the selected command in the second area as an area in which an operation is acceptable; and executing, in response to an operation performed with a second finger of the user in the acceptable area while the operation performed with the first finger is being continued in the first area, the selected command in relation to an object corresponding to an area in which the operation has been performed.

Note that, in one or more embodiments of the present invention, a "unit" does not simply mean a physical means but includes the case where the function of the "unit" is realized by software. Furthermore, the function of a single "unit" or device may be realized by two or more physical means or devices, and the functions of two or more "units" or devices may be realized by a single physical means or device.

According to one or more embodiments of the present invention, it becomes possible to provide a user interface that makes it possible to enter a large variety of commands in relation to objects quickly, in a small area, and precisely on a portable terminal having a touchscreen.

BRIEF DESCRIPTION OF DRAWINGS

FIG. 4 is a diagram showing an example of command information.

FIG. 5 is a diagram showing an example of position information.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. One or more embodiments of the present invention will be described in the context of an example of a user interface for a case where a game is executed on a portable terminal 100. However, without limitation to a game, one or more embodiments of the present invention can be applied to various user interfaces on portable terminals having touchscreens.

Figure 1:
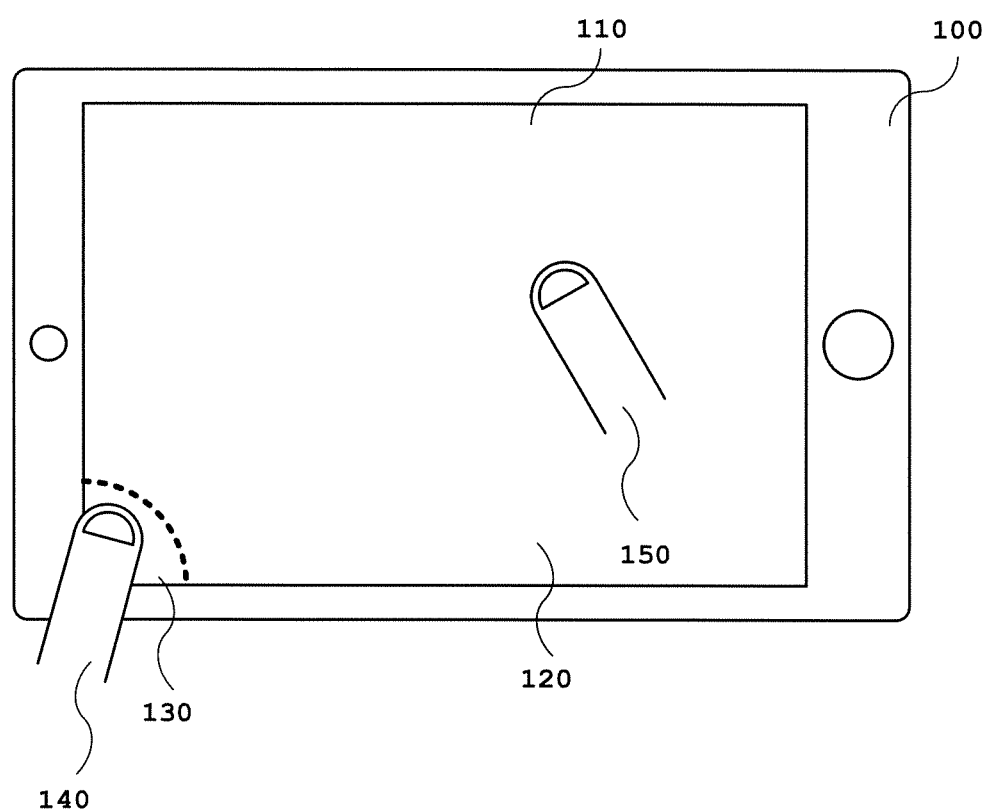
FIG. 1 is an illustration showing an external view of a portable terminal 100 according to one or more embodiments of the present invention.

FIG. 1 is an illustration showing an external view of the portable terminal 100 according to one or more embodiments of the present invention. The portable terminal 100 is a computer such as a smartphone, a tablet terminal, or a portable game machine. The portable terminal 100 includes a touchscreen 110 that functions both as a display device and an input device. The touchscreen 110 can detect a position being operated (touched) with a finger or the like. Furthermore, the touchscreen 110 may include a pressure sensor or a force sensor so that it can detect a force being applied to the touchscreen.

The display area of the touchscreen 110 is provided with an object display area 120 (a second area), in which various objects (characters) are displayed, and a command selecting area 130 (a first area), in which a command to be executed in relation to an object is selected. On the portable terminal 100, an instruction for the execution of a command in relation to an object is issued with a finger 150 (a second finger, e.g., the right thumb) in the object display area 120 while selecting the command with a finger 140 (a first finger, e.g., the left thumb) in the command selecting area 130. The command selecting area 130 may be a part of the object display area 120.

Figure 2:
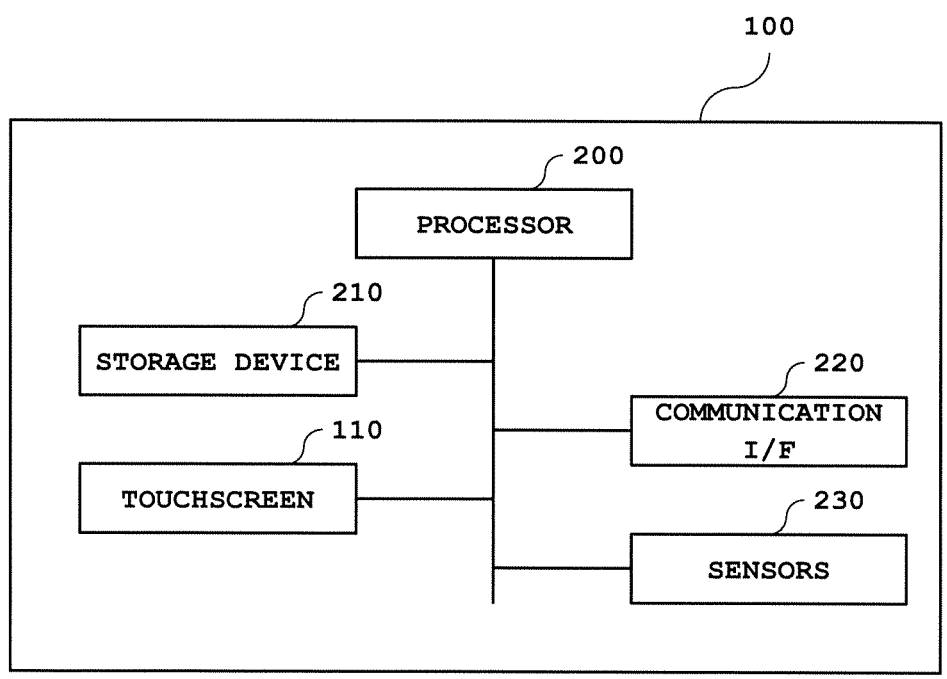
FIG. 2 is a diagram showing an example of the hardware configuration of the portable terminal 100.

FIG. 2 is a diagram showing an example of the hardware configuration of the portable terminal 100. The portable terminal 100 includes a processor 200, a storage device 210, a communication interface (I/F) 220, and sensors 230 in addition to the touchscreen 110.

The processor 200 realizes various functions of the portable terminal 100 by executing programs stored in the storage device 210.

The storage device 210 stores programs and data used in the portable terminal 100. For example, the storage device 210 includes a volatile memory, such as a RAM (Random Access Memory), and a non-volatile memory, such as a flash memory. For example, data temporarily used in processing executed by the processor 200 is stored in the volatile memory, and programs that are executed by the processor 200 are stored in the non-volatile memory. For example, the programs may be downloaded via the Internet and stored in the storage device 210. As another example, the programs may be read from a storage medium, such as a cartridge, and stored in the storage device 210.

The communication I/F 220 is an interface for carrying out communications external to the portable terminal 100. For example, the communication I/F 220 includes an interface for sending and receiving data via a mobile phone communication network or a wireless LAN (Local Area Network).

The sensors 230 are devices for detecting various states of the portable terminal 100. For example, the sensors 230 include a magnetic sensor, an angular velocity sensor, and a GPS (Global Positioning System) sensor. In the portable terminal 100, it is possible to detect the states of the portable terminal 100 on the basis of the results of detection by the sensors 230. For example, in the portable terminal 100, it is possible to detect the orientation (horizontal or vertical) of the portable terminal 100 on the basis of the results of detection by the sensors 230.

Figure 3:
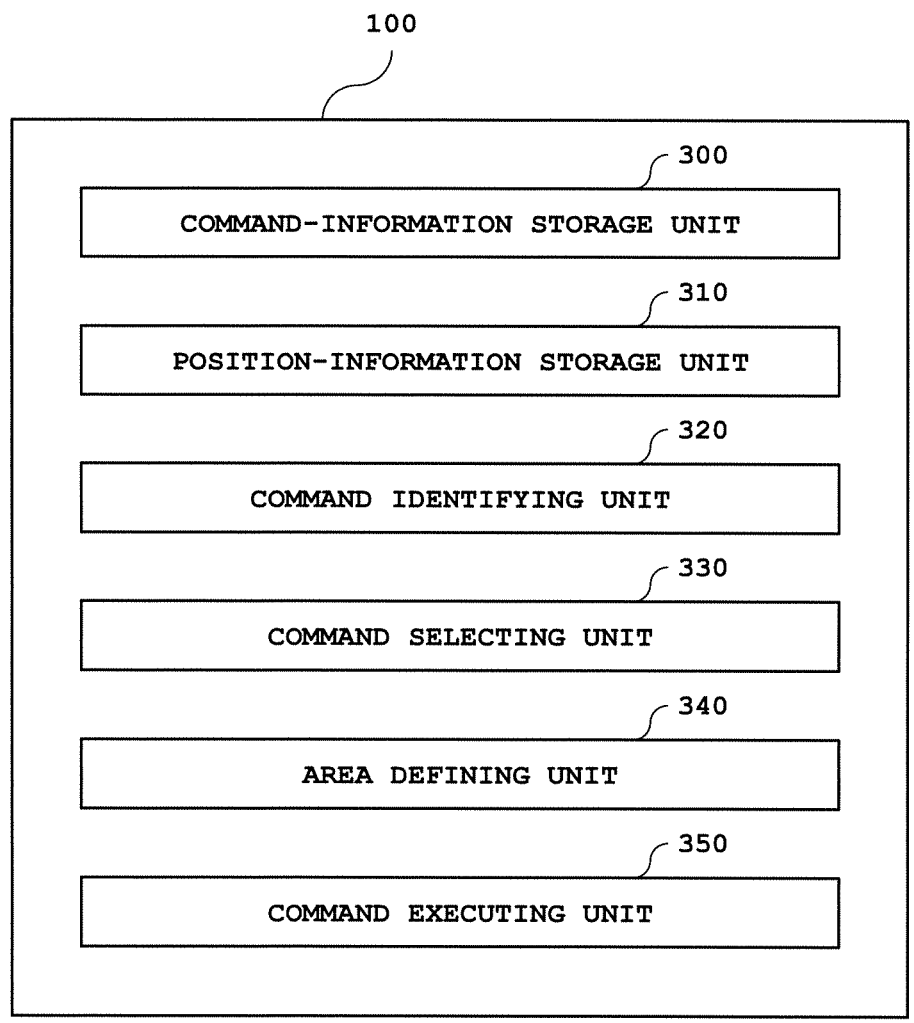
FIG. 3 is a block diagram showing some functions of the portable terminal 100.

FIG. 3 is a block diagram showing some of the functions of the portable terminal 100. The portable terminal 100 includes a command-information storage unit 300, a position-information storage unit 310, a command identifying unit 320, a command selecting unit 330, an area defining unit 340, and a command executing unit 350. These units shown in FIG. 3 are realized by the processor 200 executing programs stored in the storage device 210.

The command-information storage unit 300 stores, for a plurality of commands related to a plurality of objects that are displayed on the touchscreen 110, command information indicating the associations between the commands and the objects that serve as the targets of the commands. FIG. 4 is a diagram showing an example of the command information. In the example shown in FIG. 4, the command information includes position, situation, command identifier, object selection information, adjustment information, and image identifier.

The "position" is information indicating a position that is tapped in the command selecting area 130. The "situation" is information indicating a situation in a game being executed. For example, the information indicating the situation includes information relating to a game scene or the kinds of objects displayed on the touchscreen 110.

The "command identifier" is information for identifying each command that is executed in the game. For example, "arrow shot" is the identifier of a command for shooting an arrow on a selected object. As another example, "vulnerary" is the identifier of a command for giving a vulnerary to a selected object so that the object can recover its physical power.

The "object selection information" is information for selecting an object that serves as the target of a command. For example, "enemy" is information indicating that the target of a command is an enemy. As another example, "party" is information indicating that the target of a command is an ally (the player or an associate). The object selection information is not limited to object attributes and may be any information that makes it possible to select an object. For example, object identifiers, object names, etc. may be set as the object selection information.

The "adjustment information" is information for adjusting an area in which an object can be selected in the object display area 120. For example, the adjustment information includes information for adjusting the size of the area and information for adjusting the front/rear relationship (Z order) of the area in the depth direction. The Z order indicates priorities for a tap operation in the case where a plurality of objects overlap each other, separately from how those objects appear on the screen. For example, if the adjustment information (size) is "1.5", the area in which an object that serves as the target of a command can be selected is enlarged by a factor of 1.5 compared with the normal setting. Furthermore, if the adjustment information (Z order) is "0" (the topmost), even if a part of the target object is displayed as being hidden behind another object on the screen, the area in which the object can be selected is the same as in the case where the object is displayed in the foremost layer.

The "image identifier" is the identifier of an image indicating the kind of a command. For example, "arrow image" is the identifier of an image of an arrow, corresponding to the command for shooting an arrow. As another example, "vulnerary image" is the identifier of an image of a medicine bottle, corresponding to the command for giving a vulnerary.

Referring back to FIG. 3, the position-information storage unit 310 stores position information indicating the positions where individual objects are displayed. FIG. 5 is a diagram showing an example of the position information. In the example shown in FIG. 5, the position information includes object identifier, name, attribute, position, and shape.

The "object identifier" is the identifier of an object displayed in the object display area 120. The "name" is information indicating the name of the object. The "attribute" is information indicating an attribute of the object. For example, "party" is information indicating that the object belongs to an ally party. As another example, "enemy" is information indicating that the object is an enemy. Note that information that is set as an attribute is not limited to the party (ally/enemy) to which the object belongs and may be any information indicating an attribute of the object. For example, information relating to the ability of the object may be set as an attribute. The "position" is information indicating the position where the object is displayed. For example, the "position" may be the position of the center of gravity of the object. As another example, the "position" may be represented in the form of relative coordinates from the top left (origin) of the object display area 120. The "shape" is information indicating the shape of the object. For example, the "shape" may be information indicating an image of the object or information indicating a set of polygons.

Referring back to FIG. 3, the command identifying unit 320 identifies commands that can be executed in the current situation from among a plurality of commands. Specifically, the command identifying unit 320 refers to the command information in the command-information storage unit 300 and identifies commands with which the "situation" matches the current situation as commands that can be executed. One or more commands may be identified. In the case where the commands that can be executed are fixed, the portable terminal 100 need not include the command identifying unit 320.

The command selecting unit 330 selects a command to be executed in relation to an object from among the commands identified by the command identifying unit 320 on the basis of the status of operation with the finger 140 (e.g., the left thumb) of the user in the command selecting area 130. Specifically, the command identifying unit 320 selects a command on the basis of a position where a tap is performed and is being maintained (a tap and hold is performed) in the command selecting area 130.

Note that the user operation for causing the command selecting unit 330 to select a command is not limited to the above example. For example, the command selecting unit 330 may determine a command on the basis of the magnitude of the force with which the command selecting area 130 is being touched. For example, the force with which the command selecting area 130 is being touched is detected by the pressure sensor or the force sensor of the touchscreen 110. As the "force" that serves as a criterion when the command selecting unit 330 selects a command, any force applied to the touchscreen 110 may be used, without limitation to a force in a direction perpendicular to the touchscreen 110. For example, a force applied in an oblique direction relative to the touchscreen 110 may be used. Furthermore, without limitation to a pressure sensor or a force sensor, any sensor that can detect a force applied to the touchscreen 110 may be used.

As another example, the command selecting unit 330 may detect a state where the finger 140 is placed in an area neighboring the command selecting area 130 without making contact with the touchscreen 110 (what is called a "hover operation") and may determine a command on the basis of a position of the command selecting area 130 designated in this manner.

The area defining unit 340 defines an area corresponding to the displayed position of the object selected by the command selecting unit 330 and serving as the target of the command from the object display area 120 as an area in which an operation is acceptable. Specifically, on the basis of the command information stored in the command-information storage unit 300, the area defining unit 340 identifies an object that serves as the target of the selected command. Then, on the basis of the position information stored in the position-information storage unit 310, the area defining unit 340 defines the area corresponding to the displayed position of the identified object as an area in which an operation is acceptable. At this time, the area defining unit 340 can adjust the size of the acceptable area on the basis of the "adjustment information" set for the command information.

When an operation is performed with the finger 150 (e.g., the right thumb) of the user in the acceptable area defined by the area defining unit 340 while the operation with the finger 140 (e.g., the left thumb) of the user is being continued in the command selecting area 130, the command executing unit 350 executes the command selected in the command selecting area 130 in relation to the object corresponding to the area in which the operation is performed. For example, the operation with the finger 150 at this time may be a tap. Note, however, that the operation in the defined area is not limited to a tap. Furthermore, the kind of the operation may be changed in accordance with the selected command.

Examples of user interfaces in one or more embodiments of the present invention will be described with reference to FIGS. 6 to 8.

Figure 6:
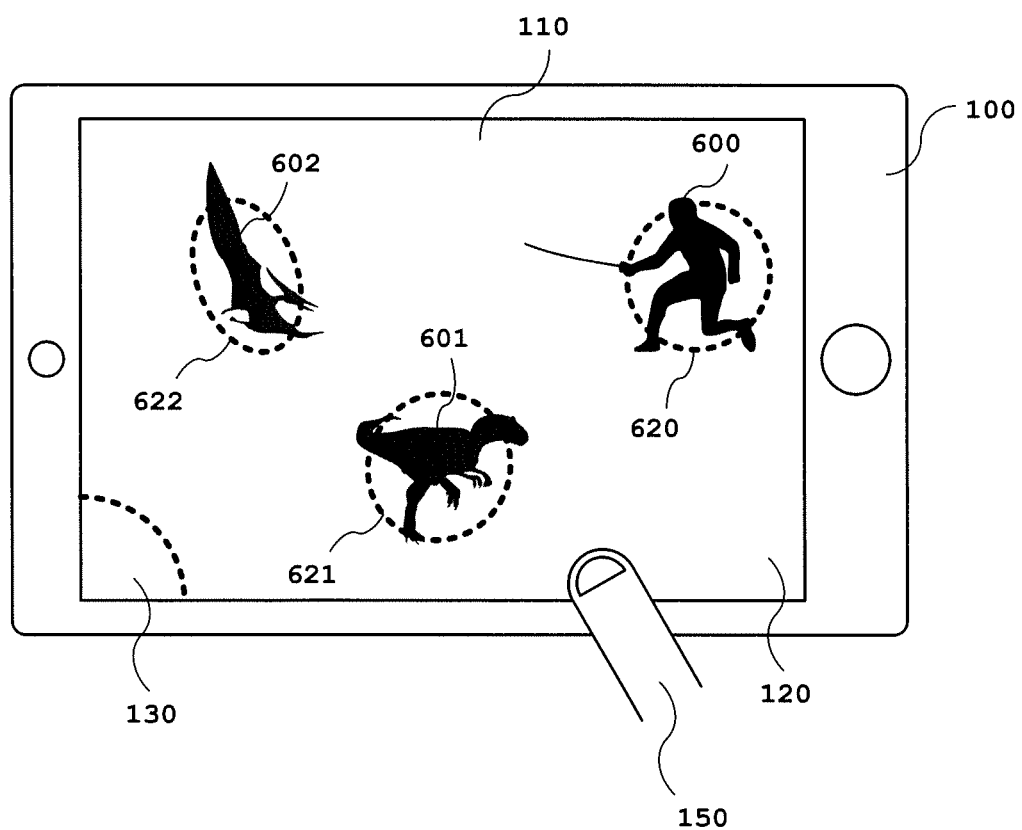
FIG. 6 is an illustration showing an example of a user interface in a state where a command selecting area 130 is not being operated.

FIG. 6 is an illustration showing an example of a user interface in a state where the command selecting area 130 is not being operated. In the example shown in FIG. 6, three objects 600, 601, and 602 are displayed in the object display area 120. Here, it is assumed that the object 600 is an object of the player (attribute: party) and the objects 601 and 602 are objects of the enemy (attribute: enemy).

In the case where the command selecting area 130 is not being operated, when the object display area 120 is operated with the finger 150 (e.g., the right thumb), a predetermined command is executed in relation to the object. Areas 620 to 622 in which an operation is acceptable are set individually for the objects 600 to 602. For example, the area 621 of the object 601, which is an enemy, is tapped with the finger 150, a command for attacking the object 601 with a knife is executed. As another example, an area other than the areas 620 and 621 in the object display area 120 is tapped with the finger 150, a command for moving the object 600 of the player to the tapped position is executed.

Figure 7A:
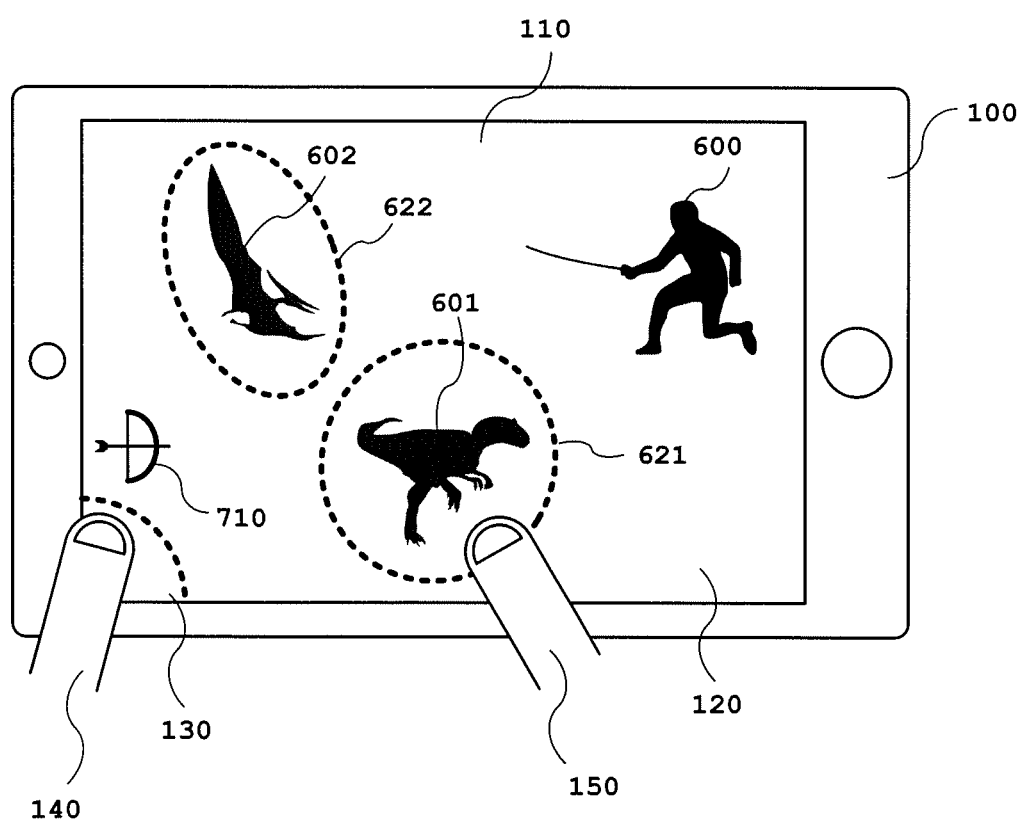
FIG. 7A is an illustration showing an example of a user interface in a state where the command selecting area 130 is being operated.

FIG. 7A is an illustration showing an example of a user interface in a state where the command selecting area 130 is being operated. In the example shown in FIG. 7A, the command selecting area 130 is being operated with the finger 140 (e.g. the left thumb).

In this example, a command for shooting an arrow is selected according to the position of the finger 140, and an image 710 of an arrow indicating the command is displayed in an area (a third area) in the vicinity of the position where the finger 140 is placed. Furthermore, in this example, the objects 601 and 602, which are enemies, are objects that may serve as a target of the command for shooting an arrow. Thus, the acceptable areas 621 and 622 for these objects 601 and 602 are larger compared with the case in FIG. 6. Furthermore, for example, when the enlarged area 621 is tapped with the finger 150 (e.g., the right thumb), a command for shooting an arrow on the object 601 corresponding to the area 621 is executed. The operation for the object 602 is similar. The areas 621 and 622 are updated dynamically as the displayed positions of the objects 601 and 602 are updated. Furthermore, it is possible to prohibit accepting operations in the area other than the areas 621 and 622 in the object display area 120.

Figure 7B:
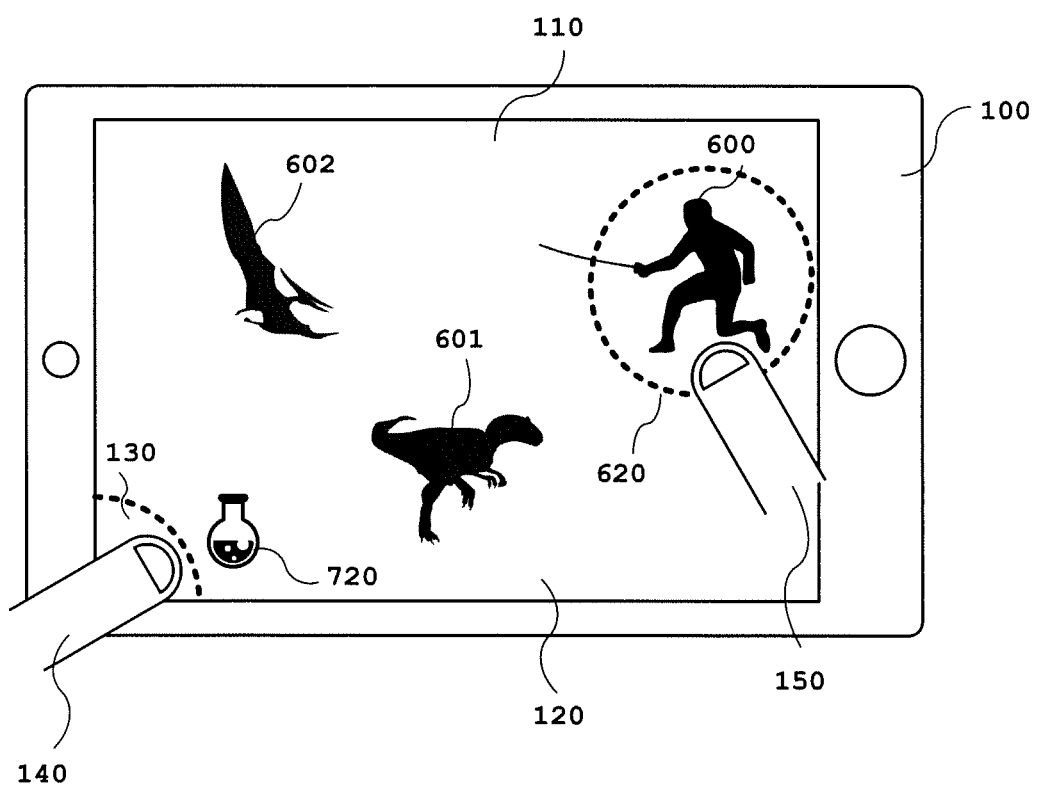
FIG. 7B is an illustration showing another example of a user interface in a state where the command selecting area 130 is being operated.

FIG. 7B is an illustration showing another example of a user interface in a state where the command selecting area 130 is being operated. In the example shown in FIG. 7B, the command selecting area 130 is being operated with the finger 140 (e.g., the left thumb).

In this example, a command for giving a vulnerary is selected according to the position of the finger 140, and an image 720 of a medicine bottle indicating the command is displayed in an area (a third area) in the vicinity of the position where the finger 140 is placed. Furthermore, in this example, the object 600, which is an ally, is an object that may serve as a target of the command for giving a vulnerary. Thus, the acceptable area 620 for the object 600 is larger compared with the case in FIG. 6. Furthermore, for example, when the enlarged area 620 is tapped with the finger 150 (e.g., the right thumb), the command for giving a vulnerary to the object 600 corresponding to the area 620 is executed. The area 620 is updated dynamically as the displayed position of the object 600 is updated. Furthermore, it is possible to prohibit accepting operations in the area other than the area 620 in the object display area 120.

As shown in FIGS. 7A and 7B, areas corresponding to the displayed positions of objects that may serve as a target of the command selected in the command selecting area 130 are defined as areas in which an operation is acceptable. Then, the selected command is executed when an operation (e.g., a tap) is performed in relation to an object in an area in which an operation is acceptable. As described above, with the user interface according to one or more embodiments of the present invention, it is possible to change the interpretation of an operation in the object display area 120 by selecting a command in the command selecting area 130, and it is possible to perform an operation in the object display area 120 without having to release the finger from the command selecting area 130 and to perform another operation. This makes it possible to enter a large variety of commands in relation to objects quickly, in a small area, and precisely.

The shape of a defined area is arbitrary. For example, the shape of a defined area may be a shape defined by enlarging the shape of an object or an ellipse centered at the position of the center of gravity of an object. Furthermore, a defined area may be displayed in a distinguishable fashion. For example, the object or the area may be displayed in a display mode different from the display modes of the other objects or the other areas. Furthermore, the areas in which the images 710 and 720 indicating commands are displayed are not limited to areas neighboring the command selecting area 130. For example, the areas in which the images 710 and 720 are displayed may be areas neighboring the acceptable areas for objects that may serve as the targets of commands.

Figure 8:
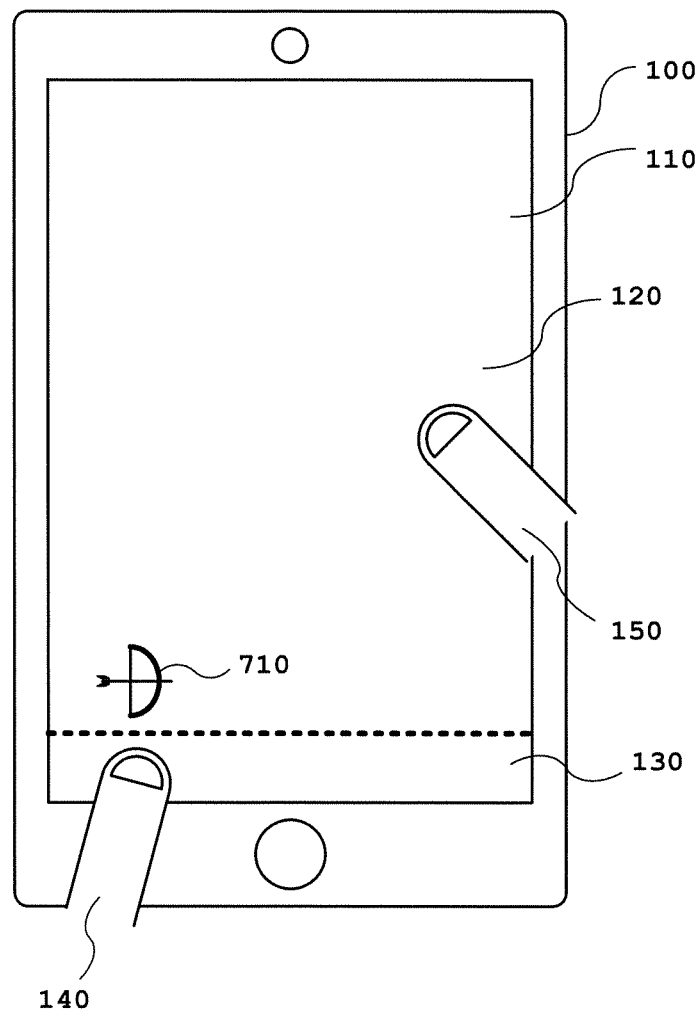
FIG. 8 is an illustration showing an example of a user interface in a state where the portable terminal 100 is held in a vertical orientation.

FIG. 8 is an illustration showing an example of a user interface in a state where the portable terminal 100 is held in a vertical orientation. As shown in FIG. 8, in the case of the vertical orientation, the position of the command selecting area 130 is set on the lower side in FIG. 8. It is possible to select a command by sliding the finger 140 (e.g., the left thumb) leftward or rightward in the command selecting area 130. Furthermore, similarly to the case of a horizontal orientation, it is possible to execute a command in relation to an object by performing an operation (e.g., a tap) with the finger 150 (e.g., the right thumb) in the object display area 120.

Figure 9:
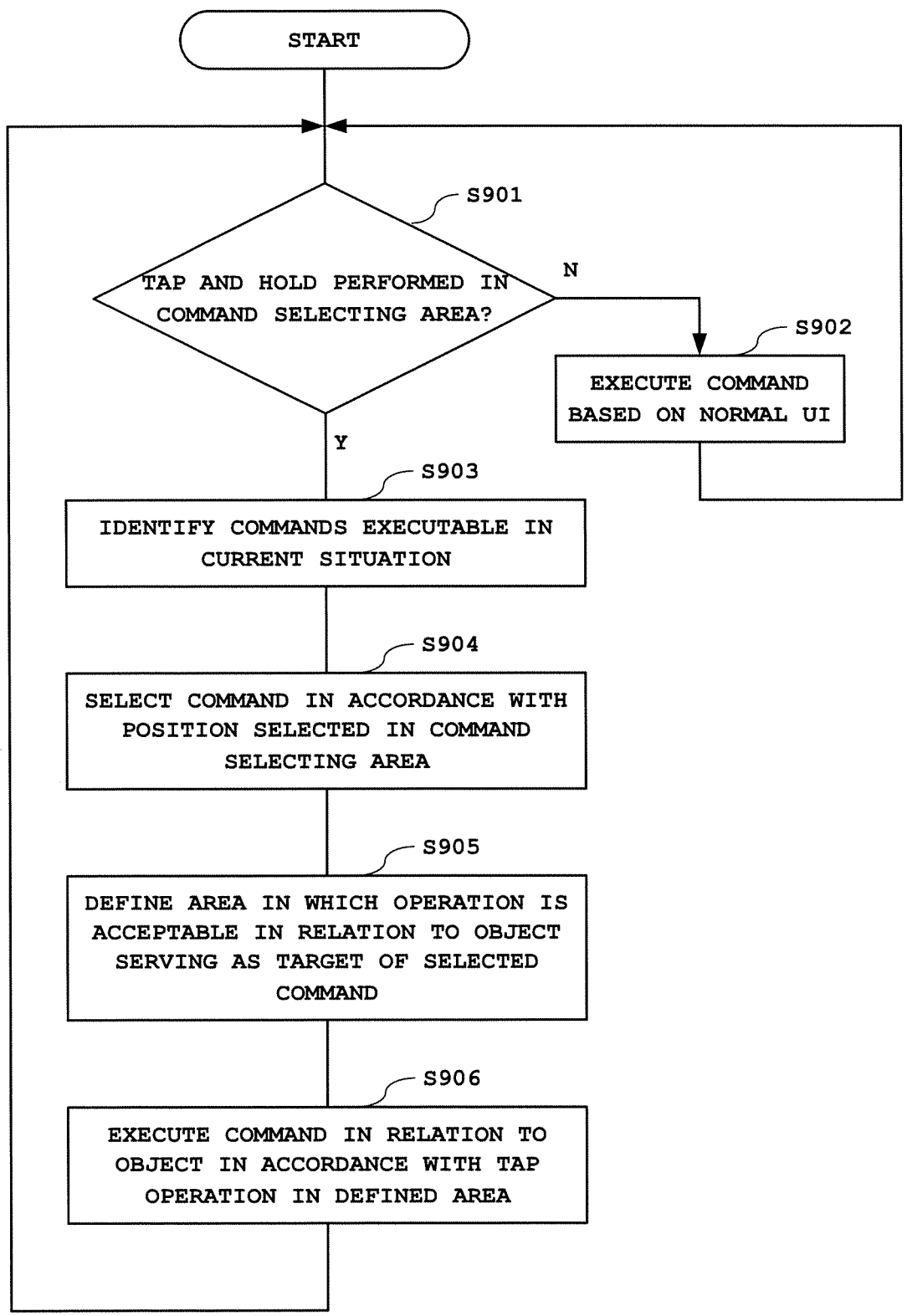
FIG. 9 is a flowchart showing an example of processing relating to a user interface in the portable terminal 100.

FIG. 9 is a flowchart showing an example of processing relating to a user interface in the portable terminal 100.

The command selecting unit 330 confirms whether a tap and hold is being performed in the command selecting area 130 (S901). In the case where a tap and hold is not being performed (S901: N), the command executing unit 350 executes a command based on the normal user interface, as in the example shown in FIG. 6 (S902).

In the case where a tap and hold is being performed in the command selecting area 130 (S901: Y), the command identifying unit 320 identifies commands that can be executed in the current situation on the basis of the command information (S903). Then, the command selecting unit 330 selects a command from among the identified commands according to the position of the command selecting area 130 on the basis of the command information (S904).

When a command has been selected, the area defining unit 340 defines areas in which an operation is acceptable in relation to an object that may serve as the target of the selected command, as in the examples shown in FIGS. 7A and 7B (S905). At this time, the area defining unit 340 may enlarge the areas in which an operation is acceptable in relation to a target object compared with the case of the normal user interface (S902). Then, the command executing unit 350 executes the command in relation to the object in accordance with a tap operation in a defined area (S906).

The user interface in the portable terminal 100 according to embodiments of the present invention has been described above. According to one or more embodiments of the present invention, as shown in FIGS. 7A and 7B, it is possible to select a command on the basis of the operation status of the finger 140 (e.g., the left thumb) in a state where a tap and hold is being performed with the finger 140 in the command selecting area 130 and to define areas corresponding to the displayed positions of objects that may serve as a target of the selected command as areas in which an operation with the finger 150 (e.g., the right thumb) is acceptable. This makes it possible to switch commands without having to change the manner of holding the portable terminal 100 or having to perform operations in multiple steps and also makes it possible to issue an instruction for the execution of a command with a simple operation (e.g., a tap) without having to release the finger from the command selecting area 130 and perform another operation. Accordingly, it becomes possible to enter a large variety of commands in relation to objects quickly, in a small area, and precisely.

Furthermore, according to one or more embodiments of the present invention, it is possible to select a command on the basis of a position being operated with the finger 140 (e.g., the left thumb) in the command selecting area 130.

Accordingly, it is possible to readily switch commands by changing the position of the finger 140 in the command selecting area 130, as shown in FIGS. 7A and 7B.

Furthermore, according to one or more embodiments of the present invention, it is possible to continuously switch commands in accordance with an operation in which the finger 140 (e.g., the left thumb) is moved while keeping contact in the command selecting area 130. This makes it possible to switch commands smoothly since there is no need to release the finger 140 from the touchscreen 110 when switching commands.

Furthermore, according to one or more embodiments of the present invention, it is possible to select a command on the basis of the magnitude of a force being applied with the finger 140 (e.g., the left thumb) in the command selecting area 130. Accordingly, it is possible to readily switch commands by changing the force of pressing with the finger 140 in the command selecting area 130.

Furthermore, according to one or more embodiments of the present invention, it is possible to continuously switch commands in accordance with an operation in which the force being applied with the finger 140 (e.g., the left thumb) is changed while keeping the finger 140 in contact in the command selecting area 130. This makes it possible to switch commands smoothly since there is no need to release the finger 140 from the touchscreen 110 when switching commands.

Furthermore, according to one or more embodiments of the present invention, it is possible to adjust the size of an area in which an operation is acceptable in relation to an object that may serve as a target of the selected command. Specifically, as shown in FIGS. 7A and 7B, it is possible to adjust the size or the front/rear relationship of the area in which an operation is acceptable in relation to an object that may serve as a target of the selected command compared with the case of the normal user interface. This makes it possible to reduce operation errors and to enhance the detection precision.

Furthermore, according to one or more embodiments of the present invention, it is possible to update the area in which an operation is acceptable in relation to an object that may serve as a target of the selected command as the displayed position of the object that may serve as a target of the selected command is updated. This makes it possible to improve the detection precision and to enable quick operation in a user interface involving updating of object positions, for example, as in the case of a game.

Furthermore, according to one or more embodiments of the present invention, it is possible to adopt a tap operation as an operation to be performed in the area in which an operation is acceptable in relation to an object that may serve as a target of the selected command in the command selecting area 130. This makes it possible to issue an instruction for executing the command with a simple tap operation while switching commands by performing an operation in the command selecting area 130.

Furthermore, according to one or more embodiments of the present invention, as shown in FIGS. 7A and 7B, it is possible to display images (e.g., the images 710 and 720) of the command selected in the command selecting area 130. This makes it possible to readily recognize the selected command. Although an image indicating the selected command is displayed in one or more of the above embodiments, an aid for recognizing the selected command is not limited to the images. For example, audio (sound effect) corresponding to the selected command may be output.

Furthermore, according to one or more embodiments of the present invention, it is possible to display the image indicating the selected command in an area neighboring the command selecting area 130. By displaying images in the areas neighboring the command selecting area 130, as described above, it becomes easy to recognize the selected command. As shown in FIGS. 7A and 7B, it becomes even easier to recognize the selected command by changing the displayed position of the image 710 or 720 in accordance with the position of the finger 140.

Furthermore, according to one or more embodiments of the present invention, it is possible to display the image indicating the selected command in an area neighboring an area in which an operation is acceptable in relation to an object that may serve as a target of the selected command. Accordingly, it becomes easy to recognize the selected command, and it also becomes easy to recognize an object that may serve as a target of the command.

Furthermore, according to one or more embodiments of the present invention, it is possible to switch commands that can be selected in the command selecting area 130 in accordance with the situation. This makes it possible to switch commands in accordance with the situation in a role playing game, etc. in which various situations occur.

Furthermore, according to one or more embodiments of the present invention, it is possible to display, in a distinguishable fashion, an area in which an operation is acceptable in relation to an object that may serve as a target of the command selected in the command selecting area 130. This makes it possible to readily distinguish an object that can be operated.

Furthermore, according to one or more embodiments of the present invention, as shown in FIGS. 7A, 7B, and 8, it is possible to provide the command selecting area 130 at an edge portion of the display area of the touchscreen 110. This makes it possible to select a command in an area where it is easy to place a finger, without interfering with operations on objects. Furthermore, according to one or more embodiments of the present invention, it is possible to change the position of the command selecting area 130 in accordance with the orientation of the portable terminal 100.

The above embodiments are intended to facilitate the understanding of the present invention, and are not intended to limit the interpretation of the present invention. The present invention may be modified or improved without departing from the gist thereof, and the present invention includes equivalents thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

100 Portable terminal
110 Touchscreen
120 Object display area
130 Command selecting area
140, 150 Finger
200 Processor
210 Storage device
220 Communication interface
230 Sensors
300 Instruction-information storage unit 310 Position-information storage unit
320 Command identifying unit
330 Command selecting unit
340 Area defining unit
350 Command executing unit
600, 601, 602 Object
620, 621, 622 Area
710, 720 Image

The invention claimed is:

1. A non-transitory computer readable medium containing a program for a portable terminal including a touchscreen displaying a game interface having a command selecting area and an object display area, the program causing a computer to perform:
   storing command information indicating associations between a plurality of game commands and a plurality of game objects, the plurality of game objects being displayed in the game interface, wherein the plurality of game objects serve as targets of the plurality of game commands and represent entities in a game displayed on the game interface;
   storing position information indicating a displayed position of each of the plurality of game objects in the object display area;
   selecting a command from the plurality of game commands based on a state in which a first operation is being performed with a first finger of a user in the command selecting area;
   defining, based on the command information and the position information, a plurality of predetermined areas corresponding to the positions of the plurality of game objects in the object display area, wherein the plurality of game objects are targets for a second operation that implements the selected command;
   adjusting the sizes of the plurality of predetermined areas based on the command information for the selected command to produce a plurality of adjusted areas, respectively;
   simultaneously displaying the plurality of adjusted areas in the game interface such that the size of each of the plurality of adjusted areas is indicated in the game interface wherein each of the plurality of adjusted areas is centered on and extends beyond a different associated object of the plurality of game objects; and
   executing, in response to the second operation being performed with a second finger of the user in one of the adjusted areas while the first finger is simultaneously contacting the command selecting area, the selected command, wherein executing the selected command performs the selected command with the associated object that the one of the adjusted areas is centered on.

2. The non-transitory computer readable medium containing the program according to claim 1, wherein the command is selected based on a position at which the first operation is being performed with the first finger in the command selecting area.

3. The non-transitory computer readable medium containing the program according to claim 2, the program causing the computer to further perform:
   continuously switching the selected command in accordance with an operation in which the first finger is moved while maintaining contact with the command selecting area.

4. The non-transitory computer readable medium containing the program according to claim 3, the program causing the computer to further perform:
   continuously switching the selected command in accordance with a third operation in which a force being applied with the first finger is changed while keeping the first finger in contact with the command selecting area.

5. The non-transitory computer readable medium containing the program according to claim 1, wherein the command is selected based on a magnitude of a force being applied with the first finger in the command selecting area.

6. The non-transitory computer readable medium containing the program according to claim 1,
   wherein the command information includes adjustment information for adjusting of the sizes of the plurality of adjusted areas, and
   wherein the sizes of the plurality of adjusted areas are adjusted for each of the plurality of game objects based on the adjustment information.

7. The non-transitory computer readable medium containing the program according to claim 1, the program causing the computer to further perform:
   updating the plurality of adjusted areas as the position of each of the plurality of game objects is updated.

8. The non-transitory computer readable medium containing the program according to claim 1, wherein the second operation being performed with the second finger is a tap operation in the one of the plurality of adjusted areas.

9. The non-transitory computer readable medium containing the program according to claim 1, the program causing the computer to further perform:
   displaying an image indicating the selected command in a third area of the touchscreen.

10. The non-transitory computer readable medium containing the program according to claim 9, wherein the third area is an area neighboring the command selecting area.

11. The non-transitory computer readable medium containing the program according to claim 9, wherein the third area is an area neighboring the one of the plurality of adjusted areas.

12. The non-transitory computer readable medium containing the program according to claim 1, the program causing the computer to further perform:
   identifying one or more commands that can be executed in a current situation from among the plurality of game commands, and
   wherein the command is selected based on the state in which the first operation is being performed with the first finger from among the identified one or more commands.

13. The non-transitory computer readable medium containing the program according to claim 1, the program causing the computer to further perform:
   displaying the plurality of adjusted areas in a distinguishable fashion.

14. The non-transitory computer readable medium containing the program according to claim 1, wherein the command selecting area is an edge portion of a display area of the touchscreen.

15. A portable terminal comprising:
   a touchscreen displaying a game interface having a command selecting area and an object display area;
   a memory coupled to the touchscreen, wherein the memory is configured to:
      store command information indicating associations between a plurality of game commands and a plurality of game objects, the plurality of game objects being displayed in the game interface, wherein the plurality of game objects serve as targets of the plurality of game commands and represent entities in a game displayed on the game interface, and store position information indicating a displayed position of each of the plurality of game objects in the object display area; and a processor coupled to the memory and the touchscreen, wherein the processor is configured to:

select a command from the plurality of game commands based on a state in which a first operation is being performed with a first finger of a user in the command selecting area, define, based on the command information and the position information, a plurality of predetermined areas corresponding to the positions of the plurality of game objects in the object display area, wherein the plurality of game objects are targets for a second operation that implements the selected command, adjust the sizes of the plurality of predetermined areas based on the command information for the selected command to produce a plurality of adjusted areas, respectively, simultaneously display the plurality of adjusted areas in the game interface such that the size of each of the adjusted areas is indicated in the game interface, wherein each of the plurality of adjusted areas is centered on and extends beyond a different associated object of the plurality of game objects; and execute, in response to the second operation being performed with a second finger of the user in one of the plurality of adjusted areas while the first finger is simultaneously contacting the command selecting area, the selected command, wherein executing the selected command performs the selected command with the associated object that the one of the plurality of adjusted areas is centered on.

16. A method for controlling a portable terminal including a touchscreen displaying a game interface having a command selecting area and an object display area, comprising:

storing command information indicating associations between a plurality of game commands and a plurality of game objects, the plurality of game objects being displayed in the game interface, wherein the plurality of game objects serve as targets of the plurality of game commands and represent entities in a game displayed on the game interface;

storing position information indicating a displayed position of each of the plurality of game objects in the object display area;

selecting a command from the plurality of game commands based on a state in which a first operation is being performed with a first finger of a user in the command selecting area;

defining, based on the command information and the position information, a plurality of predetermined areas corresponding to the positions of the plurality of game objects in the object display area, wherein the plurality of game objects are targets for a second operation that implements the selected command;

adjusting the sizes of the plurality of predetermined areas based on the command information for the selected command to produce a plurality of adjusted areas, respectively;

simultaneously displaying the plurality of adjusted areas in the game interface such that the size of each of the adjusted areas is indicated in the game interface, wherein each of the plurality of adjusted areas is centered on and extends beyond a different associated object of the plurality of game objects; and executing, in response to the second operation being performed with a second finger of the user in one of the plurality of adjusted areas while the first finger is simultaneously contacting the command selecting area, the selected command, wherein executing the selected command performs the selected command with the associated object that the one of the plurality of adjusted areas is centered on.

\* \* \* \* \*